(12) United States Patent
Heyduck et al.

(10) Patent No.: US 11,486,167 B2
(45) Date of Patent: Nov. 1, 2022

(54) CENTRAL LOCKING DEVICE FOR A DOOR LOCK WITH ACCIDENT DETECTION DEVICE

(71) Applicants: Jan Heyduck, Sindelfingen (DE); Jurgen Jooss, Boblingen (DE); Martin Lindmayer, Sulz (DE); Bernd Reifenberg, Essen (DE); Michael Rhein, Monchengladbach (DE)

(72) Inventors: Jan Heyduck, Sindelfingen (DE); Jurgen Jooss, Boblingen (DE); Martin Lindmayer, Sulz (DE); Bernd Reifenberg, Essen (DE); Michael Rhein, Monchengladbach (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 1093 days.

(21) Appl. No.: 16/122,718

(22) Filed: Sep. 5, 2018

(65) Prior Publication Data
US 2019/0078357 A1   Mar. 14, 2019

(30) Foreign Application Priority Data
Sep. 9, 2017   (DE) .................... 10 2017 008 519.6

(51) Int. Cl.
*H04N 5/44*   (2011.01)
*E05B 77/12*   (2014.01)
(Continued)

(52) U.S. Cl.
CPC .......... *E05B 77/12* (2013.01); *B60R 21/0132* (2013.01); *E05B 81/56* (2013.01); *E05B 81/58* (2013.01); *B60R 2021/01204* (2013.01)

(58) Field of Classification Search
CPC .......... E05B 77/12; E05B 81/56; E05B 81/58; E05B 77/04; E05B 77/54; B60R 21/0132; B60R 2021/01204
See application file for complete search history.

(56) References Cited

U.S. PATENT DOCUMENTS 6,002,341 A * 12/1999 Ohta .................... B60R 25/24
340/5.72
6,809,630 B1 * 10/2004 Dreimann ............ E05B 85/10
340/5.62
(Continued)

FOREIGN PATENT DOCUMENTS

CN   105121765 A * 12/2015 ............ B60R 25/01
CN   108474223 A *  8/2018 ............... B60J 5/00
(Continued)

*Primary Examiner* — Munear T Akki
(74) *Attorney, Agent, or Firm* — Fay Sharpe LLP

(57) ABSTRACT

A central locking device for door locks of a motor vehicle includes a control device and, connected thereto, locking couplings in the door locks. An accident detection device is provided for determining an accident situation of the motor vehicle and for transmitting an accident signal to the control device. Upon receiving the accident situation signal, the control device is set up to switch the locking couplings to the locked status for a defined period of time and then to switch them to the unlocked status. This prevents disturbances that may occur in the region of the door handle during an acute accident phase, since the door handles are not functional during the defined period of time.

5 Claims, 1 Drawing Sheet

(51) Int. Cl.
*E05B 81/56* (2014.01)
*B60R 21/0132* (2006.01)
*E05B 81/58* (2014.01)
*B60R 21/01* (2006.01)

(56) References Cited

U.S. PATENT DOCUMENTS

2009/0033459 A1* 2/2009 Ichihara ............. G07C 9/00309
340/5.28
2011/0187519 A1* 8/2011 Nass ....................... E05B 85/26
340/438

FOREIGN PATENT DOCUMENTS

DE   10 2015 209 851 A1   12/2016
KR       20080007723 A  *  1/2008  .............. E05B 11/12
WO   WO 2016/188694 A1   12/2016

* cited by examiner

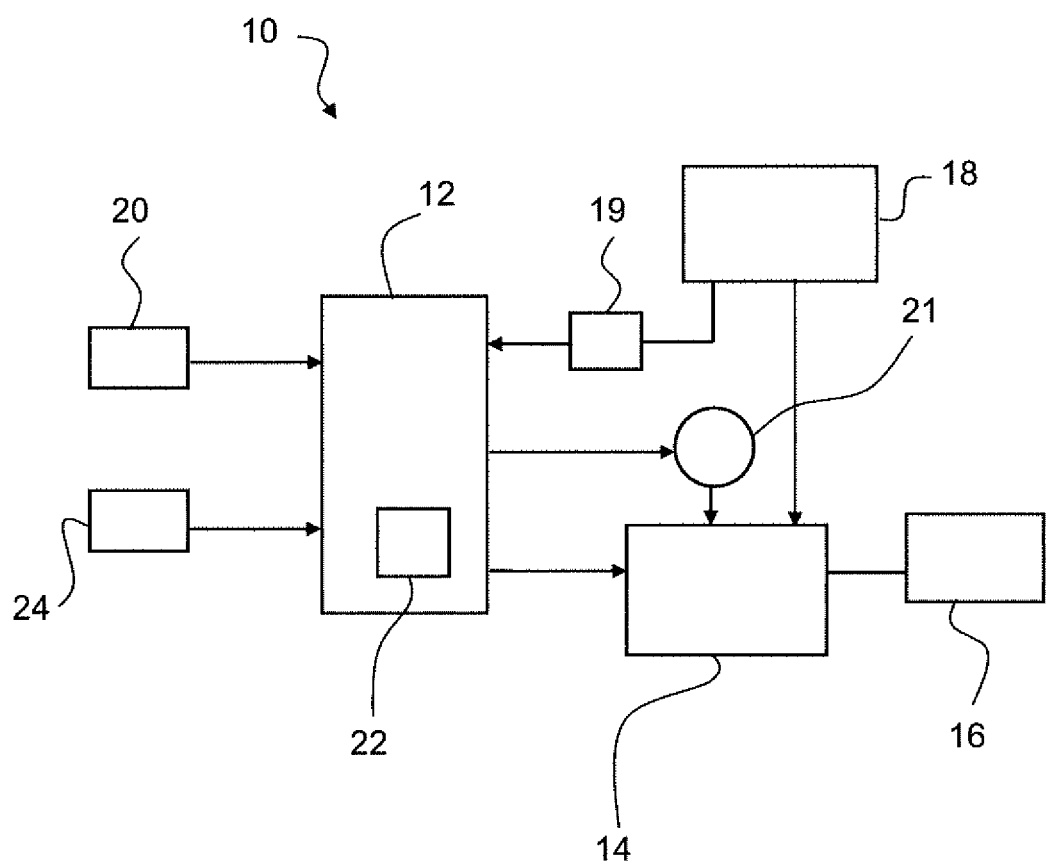

CENTRAL LOCKING DEVICE FOR A DOOR LOCK WITH ACCIDENT DETECTION DEVICE

BACKGROUND

The invention relates to a central locking device for the door locks of a motor vehicle having a control device and, connected thereto, locking couplings in the door locks. The invention furthermore relates to a motor vehicle having such a device.

A door lock for a motor vehicle is known from DE 10 2015 209 851 A1.

When a motor vehicle is involved in a serious accident, if the vehicle is still moving this can lead to unlocked vehicle doors opening due to the immediate effects thereon or on the associated door handle and thus can expose the occupants to increased risk, whether because they are thrown from the vehicle or foreign objects make their way into the passenger space.

The object of the invention is to prevent such outcomes and a central locking device that prevents unintentional opening of the vehicle doors in an accident situation.

BRIEF SUMMARY

The invention results from the features of the independent claims. Advantageous refinements and embodiments are the subject matter of the dependent claims.

The object is attained in that the central locking device comprises an accident detection device for determining an accident situation of the motor vehicle and for transmitting an accident signal to the control device, wherein, upon receiving the accident situation signal, the control device is set up to switch the locking couplings to the locked status for a defined period of time and then to switch them to the unlocked status.

In this context, the term locking couplings refers to couplings that are disposed in the mechanical link between a door handle and a door lock and that lock or unlock a door lock. The locked status of the locking coupling prevents actuation of the door handle from unlocking the door lock.

This prevents disturbances to the door handle that may occur during an acute accident phase in which the accident-involved vehicle is still moving remain without effect, since the door handles are not functional during the defined period of time. Once the defined period of time, which is a few seconds, has passed, the locking couplings are unlocked—this happens specifically even if the driver manually locked the locking couplings prior to the accident—so that the vehicle doors may be opened by the occupants or by aides by actuating the inner or outer door handles.

According to one advantageous refinement of the invention, the period of time is 2 to 15 sec., particularly preferably 5 to 10 sec. A vehicle that has been involved in an accident has typically come to rest after such a period of time, and thus access to the interior of the vehicle is facilitated in that the vehicle doors are not locked and therefore may be opened from the interior or from the exterior, provided they have not been jammed due to the effects of the accident.

According to one advantageous refinement of the invention, the control device is coupled to an accelerometer, wherein, once the accident signal has occurred, the locking couplings are unlocked if the accelerometer determines the vehicle is at rest. In this way the locking period is kept as short as possible and the vehicle doors may be opened immediately after the vehicle has reached the resting state, which can be particularly important if a fire occurs. The accelerometer may be a component of the accident detection device or of other control devices in the vehicle.

The invention furthermore relates to a motor vehicle having an accident detection device for determining an accident situation for the motor vehicle, a central locking device described in the foregoing, and at least one vehicle door that is provided with a locking coupling.

BRIEF DESCRIPTION OF THE DRAWINGS

Additional advantages, features, and details result from the following description, in which one exemplary embodiment is described in detail, referring to the drawing. Identical, similar, and/or functionally equivalent parts are provided with the same reference number.

The sole FIGURE is a schematic depiction of a central locking device according to one preferred embodiment of the invention.

DETAILED DESCRIPTION

The central locking device 10 comprises a control device 12 that is electrically connected to a number of locking couplings 14 in order to switch them between two statuses, specifically a status 0 (locking coupling is locked) and a status 1 (locking coupling is unlocked).

The locking couplings 14 are each mechanically linked to a door lock 16 and permit or prevent opening and closing of the door 16 in question, depending on status.

Door handles 18 (only one is shown) act on the locking couplings 14 either by means of manually actuating the door lock 16 or using a servo-supported electrical opening system (in this case arranged either in the door handle 18 itself or in the door lock 16). In the latter case, logic circuitry causes such electric opening signals from the door handles 18 to actuate the door locks 16.

The control device 12 is furthermore connected to an accident detection device 20 that detects, based on different sensor signals, that the vehicle is in an accident situation. Accelerometers and/or position sensors and/or optical detectors may belong to the sensor signals. The accident detection device 20 may be an integral component of the control device 12 or of other control devices for the vehicle.

If the accident detection device 20 determines that the vehicle is in an accident situation, the former provides a corresponding signal to the control device 12, which immediately switches the locking couplings 14 to status 0 (locked), so that the door locks 16 can no longer be opened, even if a door handle 18 is actuated.

At the same time, a timer 22 is started, and after a defined period of time of a few seconds it causes the control device 12 to switch the locking couplings 14 to status 1, so that the door locks 16 may be opened as soon as the associated door handle 18 is actuated.

Both systems, that is, the door opening system and the central locking system, work switched in series. As soon as one of the two is not switched, the door lock remains locked. Functionally there are the statuses: Handle not actuated (Handle=0), Handle actuated (Handle=1), Locking coupling locked (VK=0), Locking coupling unlocked (VK=1):

Handle=0, VK=0→Door lock locked
Handle=1, VK=0→Door lock locked
Handle=0, VK=1→Door lock locked
Handle=1, VK=1→Door lock unlocked, vehicle door may be opened.

In normal operations, VK=1 (if the driver does not intentionally activate the central locking device). If a door handle 18 is now pulled or a corresponding servomotor is actuated (Handle=1), the door lock 16 opens the vehicle door.

If there is an accident, crash detection by means of the accident detection device 20 locks the door lock 18, ZV=0 (Lock remains locked for a specific period of time, especially for the duration of the crash, especially approx. 10 sec., then the door lock is unlocked again, ZV=1.

Disturbances that could occur in the region of the handle during the defined period of time (Handle=1) do not have any effect, since the handle is not "functional." These disturbances on the door handle could be caused mechanically, e.g., due to deformation or accelerations.

If the disturbance occurs on an electrically actuated door handle 18 (e.g., electrical buttons) in connection with a servo-opening or servo-supported drive, the servo-drive is not "functional" in this case, either, if the door lock is locked. The servo-drive may be arranged either directly in the door lock or in the door handle.

According to one possible refinement, the control device 12 may be connected to an accelerometer 24 in order to determine whether, after an accident situation signal has been sent, the vehicle involved in the accident has come to rest. If this is the case, a signal unlocking the locking couplings 14 may be provided to the latter even prior to the defined period of time elapsing (VK=1) so that the door lock is opened, even prior to the defined period of time elapsing, when the door handle 18 of the door lock 16 is actuated.

Although the invention was illustrated in greater detail and explained in detail using preferred exemplary embodiments, the invention is not limited by the disclosed examples and the person skilled in the art may derive other variations herefrom without leaving the protective scope of the invention. It is therefore clear that there are a great number of possible variations. It is also clear that embodiments identified by way of example actually only represent examples that are not in any way to be construed as limiting the scope of protection, potential applications, or the configuration of the invention. On the contrary, the description in the foregoing and the description of the figures make it possible for the person skilled in the art to implement the exemplary embodiments specifically, wherein the person skilled in the art, given knowledge of the disclosed inventive thought, may undertake a wide variety of modifications, for instance with respect to the function or the arrangement of individual elements identified in an exemplary embodiment, without leaving the scope of protection defined by the claims and their legal equivalents, such as, for example, refining explanations in the description.

The invention claimed is:

1. A locking device for door locks of a motor vehicle comprising a control device and, connected thereto, a central locking device having locking couplings in the door locks,
   wherein door handles act on said locking couplings either by means of manually actuating the door locks via a mechanical door opening system or by means of a servo-supported electrical door opening system,
   wherein an accident detection device is provided for determining an accident situation of the motor vehicle and for transmitting an accident situation signal to the control device,
   wherein, upon receiving the accident situation signal, the control device is set up to switch the locking couplings to the locked status for a defined period of time and then to switch them to the unlocked status, and
   wherein one of the mechanical door opening system and the servo-supported electrical door opening system operates in series with the central locking system such that the door lock remains locked as soon as either the central locking system or one of the mechanical door opening system and servo-supported electrical system is not switched.

2. The locking device according to claim 1, wherein the period of time is 2 to 15 sec.

3. The locking device according to claim 2, wherein the period of time is 5 to 10 sec.

4. The locking device according to claim 1, wherein the control device is coupled to an accelerometer, and once the accident situation signal has occurred, the locking couplings are unlocked if the accelerometer determines that the vehicle is at rest.

5. The locking device of claim 1, wherein said locking device is used with a motor vehicle comprising an accident detection device for determining an accident situation for the motor vehicle, and wherein said motor vehicle further comprises at least one vehicle door that is provided with a locking coupling.

\* \* \* \* \*